(12) United States Patent
Nagorcka et al.

(10) Patent No.: US 9,434,426 B2
(45) Date of Patent: Sep. 6, 2016

(54) TRACK SUSPENSION (71) Applicant: Veyance Technologies, Inc., Fairlawn, OH (US)

(72) Inventors: James A. Nagorcka, Hamilton (AU); Lyal D. Allen, Hamilton (AU)

(73) Assignee: Veyance Technologies, Inc., Fairlawn, OH (US)

( * ) Notice: Subject to any disclaimer, the term of this patent is extended or adjusted under 35 U.S.C. 154(b) by 411 days.

(21) Appl. No.: 14/062,052

(22) Filed: Oct. 24, 2013

(65) Prior Publication Data

US 2014/0125118 A1 May 8, 2014

Related U.S. Application Data

(60) Provisional application No. 61/721,602, filed on Nov. 2, 2012.

(51) Int. Cl.
  *B62D 55/104* (2006.01)
  *B62D 55/112* (2006.01)
  *B62D 55/30* (2006.01)
  *B62D 55/14* (2006.01)

(52) U.S. Cl.
  CPC ........... *B62D 55/104* (2013.01); *B62D 55/112* (2013.01); *B62D 55/14* (2013.01); *B62D 55/305* (2013.01)

(58) Field of Classification Search
  CPC .. B62D 55/104; B62D 55/112; B62D 55/14; B62D 55/305
  USPC ............... 305/125, 129, 132, 133, 135, 142; 180/9.54, 9.56, 9.58, 9.6
  See application file for complete search history.

(56) References Cited

U.S. PATENT DOCUMENTS

| | | | |
|---|---|---|---|
| 3,841,424 A | 10/1974 | Purcell et al. | 180/9.5 |
| 4,953,919 A * | 9/1990 | Langford | B62D 55/06 305/131 |
| 5,316,381 A | 5/1994 | Isaacson et al. | 305/145 |
| 5,340,205 A | 8/1994 | Nagorcka | 305/132 |
| 5,452,949 A * | 9/1995 | Kelderman | B62D 49/0635 180/9.44 |
| 5,842,757 A | 12/1998 | Kelderman | 305/125 |
| 6,810,975 B2 * | 11/2004 | Nagorcka | B62D 55/0842 180/9.5 |
| 6,904,986 B2 * | 6/2005 | Brazier | B62D 49/0635 180/9.21 |
| 7,131,508 B2 | 11/2006 | Brazier | 280/9.21 |
| 7,328,760 B2 * | 2/2008 | Inaoka | B62D 49/0635 180/9.21 |
| 7,478,688 B2 * | 1/2009 | Ki | B62D 55/1125 180/9.1 |
| 7,597,161 B2 * | 10/2009 | Brazier | B62D 55/04 180/9.21 |
| 8,083,242 B2 * | 12/2011 | Brazier | B60G 21/04 180/9.1 |
| 8,152,248 B2 * | 4/2012 | Brazier | B62D 55/10 305/131 |
| 8,607,904 B2 * | 12/2013 | Fukumoto | B62D 49/0635 180/9.21 |

OTHER PUBLICATIONS

European Search Report for EP13190453.4.

* cited by examiner

*Primary Examiner* — Kip T Kotter
(74) *Attorney, Agent, or Firm* — Alvin T. Rockhill (57) ABSTRACT

A track suspension is provided wherein a rear wishbone member is rotatably affixed to a yoke assembly and a yoke plate carrier through a rear wishbone joint, wherein a front wishbone member is rotatably affixed to the rear wishbone member through a front wishbone joint, wherein a rear rocker assembly is comprised of a rear rocker beam, a rear roller wheel and a rear idler wheel, wherein a front rocker beam is rotatably affixed to the front wishbone through a front rocker joint, wherein the rear rocker beam is rotatably affixed to the rear wishbone member through a rear rocker joint, wherein a front suspension spring assembly is affixed between a yoke assembly and a front wishbone member, and wherein a rear suspension spring assembly is affixed between the yoke assembly and the rear wishbone member.

16 Claims, 5 Drawing Sheets

TRACK SUSPENSION

This application claims benefit of U.S. Provisional Patent Application Ser. No. 61/721,602, filed on Nov. 2, 2012. The teachings of U.S. Provisional Patent Application Ser. No. 61/721,602 are incorporated herein by reference in their entirety.

FIELD OF THE INVENTION

The present invention is in the field of suspensions for vehicles. More specifically this invention relates to suspensions for vehicles utilizing a track drive system.

BACKGROUND OF THE INVENTION

Track driven vehicles are commonly used in the agricultural and construction industries. Track driven vehicles are commonly very heavy vehicles that require a substantial load to be carried by each track and track suspension on the vehicle. For this reason, prior art suspensions have minimal travel and articulation to idler and roller wheels in contact with the track. The lack of articulation of the idler and roller wheels limits the tractive force of the track and also causes forces to be transmitted to the vehicle from the idler and roller wheels. This lack of articulation can make the ride less comfortable for the driver of the track driven vehicle and in some cases can lead to excessive vehicle part wear.

U.S. Pat. No. 3,841,424 discloses a vehicle supporting and driving assembly for a vehicle having an axle housing and a drive axle in the axle housing comprising: a main pivot shaft securable to said axle housing, a track frame having an intermediate point secured to the main pivot shaft for pivotal oscillation of the track frame with respect to said axle housing, and having first and second ends extending from said intermediate point, idler support members at the first and second ends of the track frame, means pivotally and reciprocably securing the idler support members to the track frame ends, idlers rotatably mounted on the idler support members, cushion means responsive to reciprocation of the idler support members with respect to the track frame ends to cushion recoil of the idlers, a rotatable drive sprocket attachable to said axle housing and positioned between the ends of said track frame and above the idlers, means driving the rotatable drive sprocket by the drive axle, and a track chain encompassing the idlers and drive sprocket and in driven engagement with the drive sprocket.

U.S. Pat. No. 5,842,757 discloses a track suspension apparatus for a vehicle of a type having a powered drive shaft for rotation about a drive axis, comprising:

a frame operably pivotably attached to said vehicle drive shaft; a continuous flexible track; a drive wheel adapted to be attached to a vehicle and operatively and rotatably attached about said drive axis to said frame for engaging and driving said continuous flexible track; and an undercarriage mounted to said frame, said undercarriage including at least two leading equalizers and two trailing equalizers, the leading and trailing equalizers being independently-pivotable on said frame, each leading equalizer having leading and trailing front idler rollers rotatably attached thereto in fixed relative positions and each trailing equalizer having intermediate rollers and trailing rear idler rollers rotatably attached thereto, the rear idler rollers being rotatable attached to a trailing arm and the intermediate rollers being rotatable attached to an intermediate-roller mounting plate which is pivotably mounted with respect to the trailing arm said idler rollers being in engagement with said track.

U.S. Pat. Re. No. 36,284 discloses a track suspension apparatus for a vehicle having a frame, comprising: a continuous flexible track; a drive wheel operatively attached to said frame for engaging and driving said continuous flexible track; a leading idler arm operatively pivotally attached to said frame; a leading idler wheel in engagement with said track and rotatably mounted to one end of said leading idler arm; a trailing idler arm operatively pivotally attached to said frame; a trailing idler wheel in engagement with said track and rotatably mounted to one end of said trailing idler arm; a mid-roller assembly in engagement with said track and operatively attached to one of said idler arms; an interconnecting structure for holding said leading and trailing idler arms in a predetermined position; and cushioning means associated with said interconnecting structure for providing a shock absorbing function when said leading and trailing idler wheels move with respect to each other due to pivoting of said idler arms when irregular surfaces are encountered by said track, said cushioning means comprising a fluid control device operably attached at one end thereof to one of said idler arms and operatively attached at the other end thereof to the other one of said idler arms.

U.S. Pat. No. 5,316,381 discloses a hydraulic tensioning and suspension system having a main drive wheel located above and between two idlers that are mounted to pivot arms that are coupled to a rigid frame. In this hydraulic tensioning and suspension system two track rollers are mounted to the rigid frame by an intermediate arm and a third track roller is mounted to the front pivot arm by an additional pivot arm. Four hydraulic suspension cylinders are hydraulically coupled to one another for biassing the idlers and track rollers downwardly to provide a suspension system. The rear pivot arm is a telescoping arm having a hydraulic tensioning cylinder. A two position control valve supplies hydraulic fluid to the hydraulic tensioning cylinder in response to a speed ratio selected by the operator. With higher tension being applied to the track when the vehicle transmission is in low gear and lower tension is being applied to the track when the vehicle transmission is in higher gears.

U.S. Pat. No. 5,340,205 discloses an active suspension system for a tracked vehicle having a main drive wheel and two idlers which are surrounded by a track. The suspension system is provided with a walking beam that is pivotally mounted to the supporting structure of a vehicle by a walking beam pivot. The beam has a first section and a second section. An angled first arm is pivotally coupled to the first section of the walking beam and to which the first idler is rotatably mounted. A second telescoping arm is pivotally mounted to the supporting structure at the walking beam pivot to which the second idler is rotatably mounted. Three track rollers are operatively coupled to the angled arm by an angled link. Two of the track rollers are rotatably mounted to a bridging member which is pivotally coupled to the first arm of the angled link. The third track roller is rotatably mounted to the second arm of the angled link.

SUMMARY OF THE INVENTION

The present invention discloses a track suspension comprising a drive wheel, a yoke plate carrier, a front wishbone member, a rear wishbone member, a front rocker assembly, a rear rocker assembly, a front suspension spring assembly and a rear suspension spring assembly, wherein the drive wheel is rotatably affixed to and driven by a vehicle final drive axle assembly, wherein the yoke plate carrier is affixed to a yoke assembly, wherein the rear wishbone member is rotatably affixed to the yoke assembly and the yoke plate carrier through a rear wishbone joint, wherein the front wishbone member is rotatably affixed to the rear wishbone member through a front wishbone joint, wherein the front rocker assembly is comprised of a front rocker beam, a front idler wheel and a front roller wheel, wherein the rear rocker assembly is comprised of a rear rocker beam, a rear roller wheel and a rear idler wheel, wherein the front rocker beam is rotatably affixed to the front wishbone through a front rocker joint, wherein the rear rocker beam is rotatably affixed to the rear wishbone member through a rear rocker joint, wherein a front suspension spring assembly is affixed between the yoke assembly and the front wishbone member, and wherein a rear suspension spring assembly is affixed between the yoke assembly and the rear wishbone member.

In another embodiment of the invention, the front suspension spring assembly is selected from the group consisting of hydraulic suspension assembly, pneumatic suspension assembly and mechanical suspension assembly and the rear suspension spring assembly is selected from the group consisting of hydraulic suspension assembly, pneumatic suspension assembly and mechanical suspension assembly.

In yet another embodiment of the invention, the front hydraulic suspension assembly and the rear hydraulic suspension assembly are connected to a common oil supply from a hydraulic accumulator.

In still another embodiment of the invention, the front pneumatic suspension assembly and the rear pneumatic suspension assembly are connected to a common pneumatic pressure supply from a pneumatic accumulator.

In yet another embodiment of the invention, the front rocker assembly further comprises a track tensioning rocker and a track tensioning cylinder.

In still another embodiment of the invention a center axis of the front wishbone joint, a center axis of the front rocker joint and a center axis of the front idler wheel are substantially aligned.

In yet another embodiment of the invention the center axis of the front wishbone joint, the center axis of the front rocker joint and the center axis of the front idler wheel are substantially aligned in such a manner as to substantially bisect the angle between the leading edge of the rubber track and the lower edge of the rubber track.

In still another embodiment of the invention a center axis of the rear wishbone joint, a center axis of the rear rocker joint and a center axis of the rear idler wheel are substantially aligned.

In yet another embodiment of the invention the center axis of the rear wishbone joint, the center axis of the rear rocker joint and the center axis of the rear idler wheel are substantially aligned in such a manner as to substantially bisect the angle between the trailing edge of the rubber track and the lower edge of the rubber track.

The present invention further discloses a track suspension comprising a drive wheel, a yoke plate carrier, a front wishbone member, a rear wishbone member, a front rocker assembly, a rear rocker assembly, a front suspension spring assembly and a rear suspension spring assembly, wherein the drive wheel is rotatably affixed to and driven by a vehicle final drive axle assembly, wherein the yoke plate carrier is affixed to a yoke assembly, wherein the front wishbone member is rotatably affixed to the yoke assembly and the yoke plate carrier through a front wishbone joint, wherein the rear wishbone member is rotatably affixed to the front wishbone member through a rear wishbone joint, wherein the front rocker assembly is comprised of a front rocker beam, a front idler wheel and a front roller wheel, wherein the rear rocker assembly is comprised of a rear rocker beam, a rear roller wheel and a rear idler wheel, wherein the front rocker beam is rotatably affixed to the front wishbone through a front rocker joint, wherein the rear rocker beam is rotatably affixed to the rear wishbone member through a rear rocker joint, wherein a front suspension spring assembly is affixed between the yoke assembly and the front wishbone member, and wherein a rear suspension spring assembly is affixed between the yoke assembly and the rear wishbone member.

In another embodiment of the invention, the front suspension spring assembly is selected from the group consisting of hydraulic suspension assembly, pneumatic suspension assembly and mechanical suspension assembly and the rear suspension spring assembly is selected from the group consisting of hydraulic suspension assembly, pneumatic suspension assembly and mechanical suspension assembly.

In yet another embodiment of the invention, the front hydraulic suspension assembly and the rear hydraulic suspension assembly are connected to a common oil supply from a hydraulic accumulator.

In still another embodiment of the invention, the front pneumatic suspension assembly and the rear pneumatic suspension assembly are connected to a common pneumatic pressure supply from a pneumatic accumulator.

In yet another embodiment of the invention, the front rocker assembly further comprises a track tensioning rocker and a track tensioning cylinder.

In still another embodiment of the invention a center axis of the front wishbone joint, a center axis of the front rocker joint and a center axis of the front idler wheel are substantially aligned.

In yet another embodiment of the invention the center axis of the front wishbone joint, the center axis of the front rocker joint and the center axis of the front idler wheel are substantially aligned in such a manner as to substantially bisect the angle between the leading edge of the rubber track and the lower edge of the rubber track.

In still another embodiment of the invention a center axis of the rear wishbone joint, a center axis of the rear rocker joint and a center axis of the rear idler wheel are substantially aligned.

In yet another embodiment of the invention the center axis of the rear wishbone joint, the center axis of the rear rocker joint and the center axis of the rear idler wheel are substantially aligned in such a manner as to substantially bisect the angle between the trailing edge of the rubber track and the lower edge of the rubber track.

The present invention still further discloses a track suspension system comprising a rubber track which is adapted to be ground contacting, a drive wheel, a yoke plate carrier, a front wishbone member, a rear wishbone member, a front rocker assembly, a rear rocker assembly, a front suspension spring assembly and a rear suspension spring assembly, wherein the drive wheel is rotatably affixed to and driven by a vehicle final drive axle assembly, wherein the drive wheel is adapted for engaging and driving the rubber track, wherein the yoke plate carrier is affixed to a yoke assembly, wherein the rear wishbone member is rotatably affixed to the yoke assembly and the yoke plate carrier through a rear wishbone joint, wherein the front wishbone member is rotatably affixed to the rear wishbone member through a front wishbone joint, wherein the front rocker assembly is comprised of a front rocker beam, a front idler wheel and a front roller wheel, wherein the rear rocker assembly is comprised of a rear rocker beam, a rear roller wheel and a rear idler wheel, wherein the front rocker beam is rotatably affixed to the front wishbone through a front rocker joint, wherein the rear rocker beam is rotatably affixed to the rear wishbone member through a rear rocker joint, wherein a front suspension spring assembly is affixed between the yoke assembly and the front wishbone member, and wherein a rear suspension spring assembly is affixed between the yoke assembly and the rear wishbone member.

In another embodiment of the invention, the front suspension spring assembly is selected from the group consisting of hydraulic suspension assembly, pneumatic suspension assembly and mechanical suspension assembly and the rear suspension spring assembly is selected from the group consisting of hydraulic suspension assembly, pneumatic suspension assembly and mechanical suspension assembly.

In yet another embodiment of the invention, the front hydraulic suspension assembly and the rear hydraulic suspension assembly are connected to a common oil supply from a hydraulic accumulator.

In still another embodiment of the invention, the front pneumatic suspension assembly and the rear pneumatic suspension assembly are connected to a common pneumatic pressure supply from a pneumatic accumulator.

In yet another embodiment of the invention, the front rocker assembly further comprises a track tensioning rocker and a track tensioning cylinder.

In still another embodiment of the invention a center axis of the front wishbone joint, a center axis of the front rocker joint and a center axis of the front idler wheel are substantially aligned.

In yet another embodiment of the invention the center axis of the front wishbone joint, the center axis of the front rocker joint and the center axis of the front idler wheel are substantially aligned in such a manner as to substantially bisect the angle between the leading edge of the rubber track and the lower edge of the rubber track.

In still another embodiment of the invention a center axis of the rear wishbone joint, a center axis of the rear rocker joint and a center axis of the rear idler wheel are substantially aligned.

In yet another embodiment of the invention the center axis of the rear wishbone joint, the center axis of the rear rocker joint and the center axis of the rear idler wheel are substantially aligned in such a manner as to substantially bisect the angle between the trailing edge of the rubber track and the lower edge of the rubber track.

The present invention further discloses a track suspension comprising a drive wheel, a yoke plate carrier, a front wishbone member, a rear wishbone member, a front rocker assembly, a rear rocker assembly, a front suspension spring assembly and a rear suspension spring assembly, wherein the drive wheel is rotatably affixed to and driven by a vehicle final drive axle assembly, wherein the yoke plate carrier is affixed to a yoke assembly, wherein the front or rear wishbone member is rotatably affixed to the yoke assembly and the yoke plate carrier through a first wishbone joint, wherein the front or rear wishbone member is rotatably affixed to the front or rear wishbone member through a second wishbone joint or the front or rear wishbone member is rotatably affixed to the yoke assembly and the yoke plate carrier through the first or a second wishbone joint, wherein the front rocker assembly is comprised of a front rocker beam, a front idler wheel and a front roller wheel, wherein the rear rocker assembly is comprised of a rear rocker beam, a rear roller wheel and a rear idler wheel, wherein the front rocker beam is rotatably affixed to the front wishbone through a front rocker joint, wherein the rear rocker beam is rotatably affixed to the rear wishbone member through a rear rocker joint, wherein a front suspension spring assembly is affixed between the yoke assembly and the front wishbone member, and wherein a rear suspension spring assembly is affixed between the yoke assembly and the rear wishbone member.

In another embodiment of the invention, the front suspension spring assembly is selected from the group consisting of hydraulic suspension assembly, pneumatic suspension assembly and mechanical suspension assembly and the rear suspension spring assembly is selected from the group consisting of hydraulic suspension assembly, pneumatic suspension assembly and mechanical suspension assembly.

In yet another embodiment of the invention, the front hydraulic suspension assembly and the rear hydraulic suspension assembly are connected to a common oil supply from a hydraulic accumulator.

In still another embodiment of the invention, the front pneumatic suspension assembly and the rear pneumatic suspension assembly are connected to a common pneumatic pressure supply from a pneumatic accumulator.

In yet another embodiment of the invention, the front rocker assembly further comprises a track tensioning rocker and a track tensioning cylinder.

In still another embodiment of the invention a center axis of the front wishbone joint, a center axis of the front rocker joint and a center axis of the front idler wheel are substantially aligned.

In yet another embodiment of the invention the center axis of the front wishbone joint, the center axis of the front rocker joint and the center axis of the front idler wheel are substantially aligned in such a manner as to substantially bisect the angle between the leading edge of the rubber track and the lower edge of the rubber track.

In still another embodiment of the invention a center axis of the rear wishbone joint, a center axis of the rear rocker joint and a center axis of the rear idler wheel are substantially aligned.

In yet another embodiment of the invention the center axis of the rear wishbone joint, the center axis of the rear rocker joint and the center axis of the rear idler wheel are substantially aligned in such a manner as to substantially bisect the angle between the trailing edge of the rubber track and the lower edge of the rubber track.

DETAILED DESCRIPTION OF THE INVENTION

Figure 1:
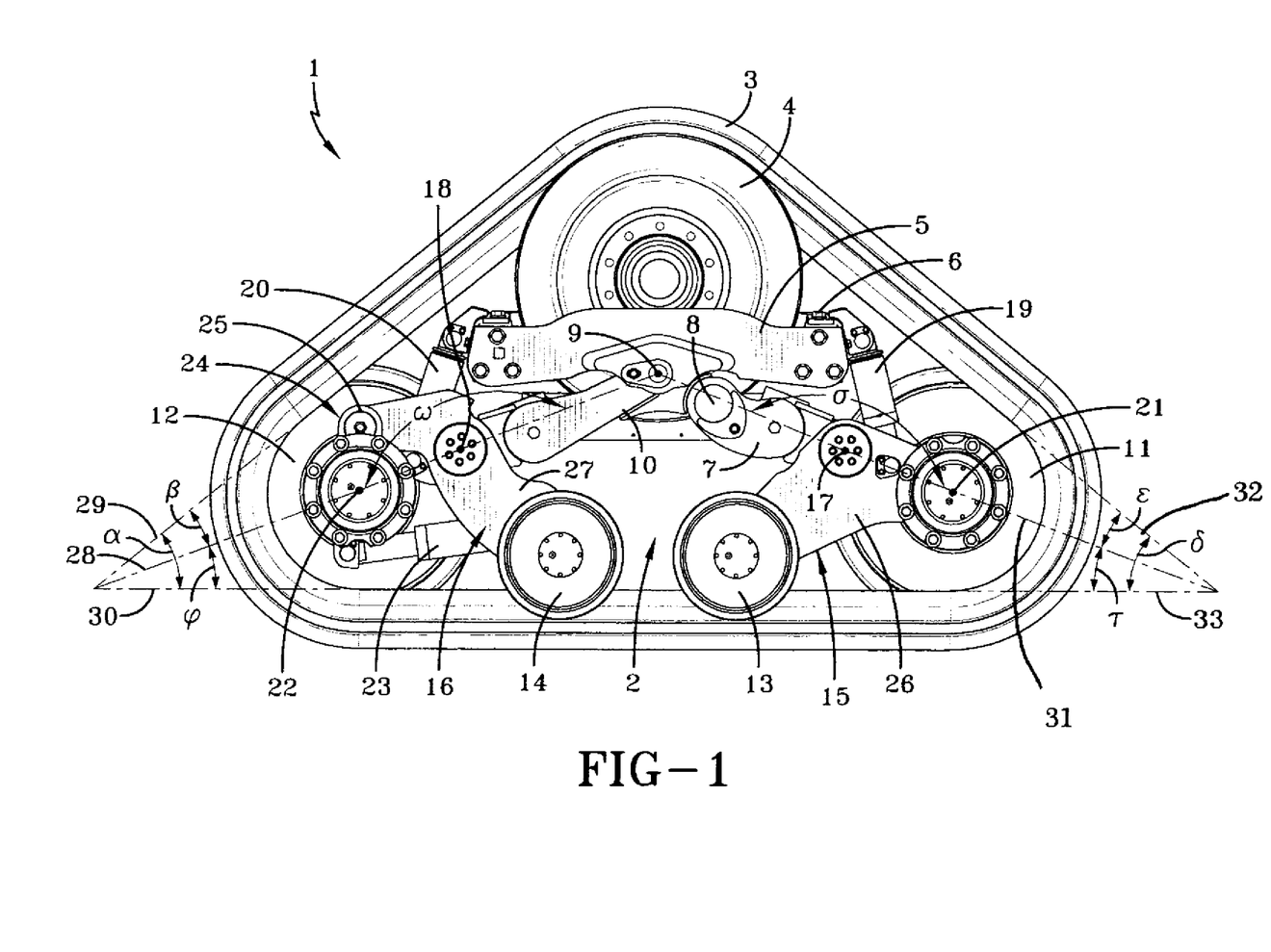
FIG. 1 is a side view of a track suspension system in a flat condition.
Figure 2:
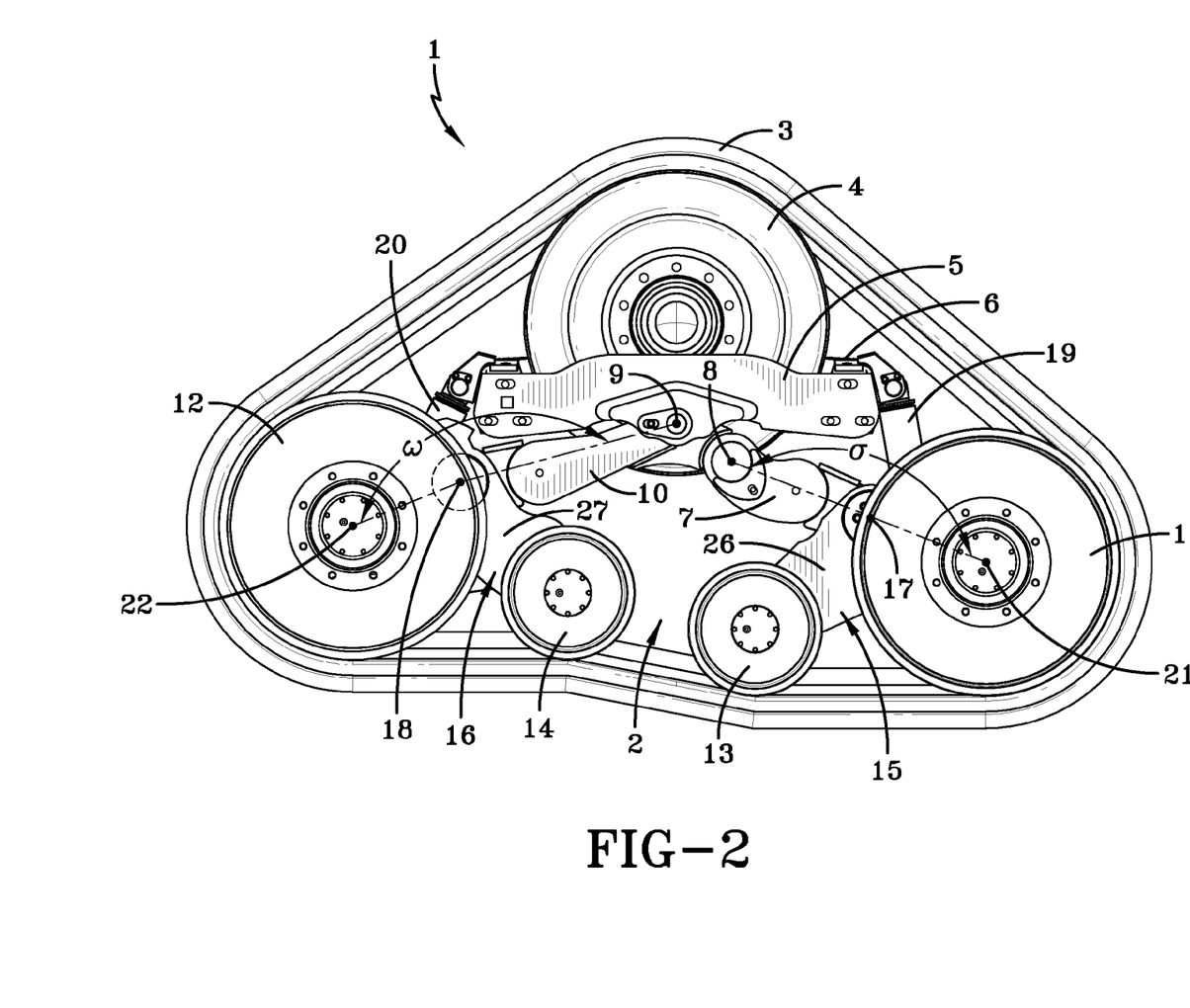
FIG. 2 is a side view of a track suspension system with the front wheel articulated above the flat position.
Figure 3:
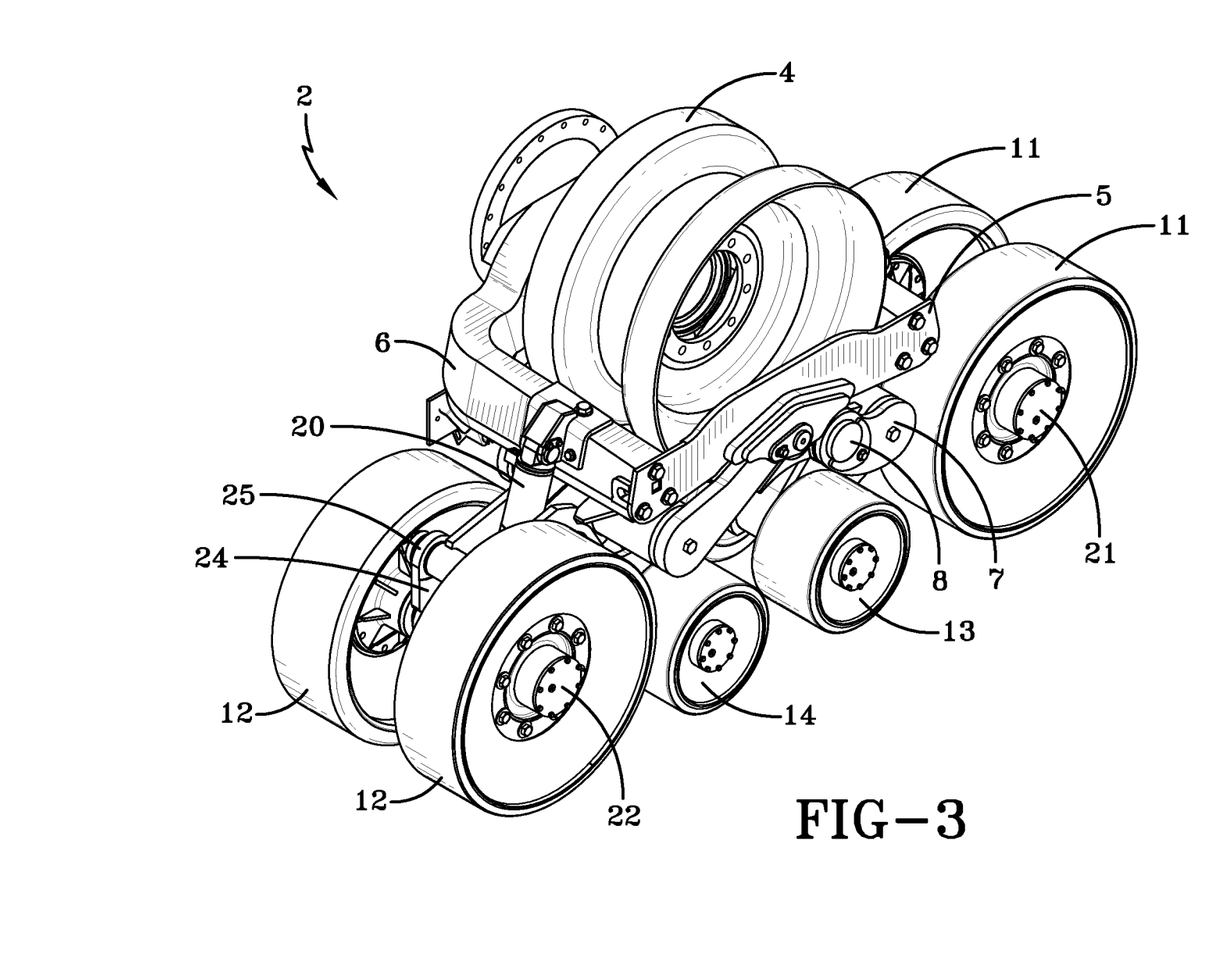
FIG. 3 is a perspective view of a track suspension with the front wheel articulated above the flat position.
Figure 4:
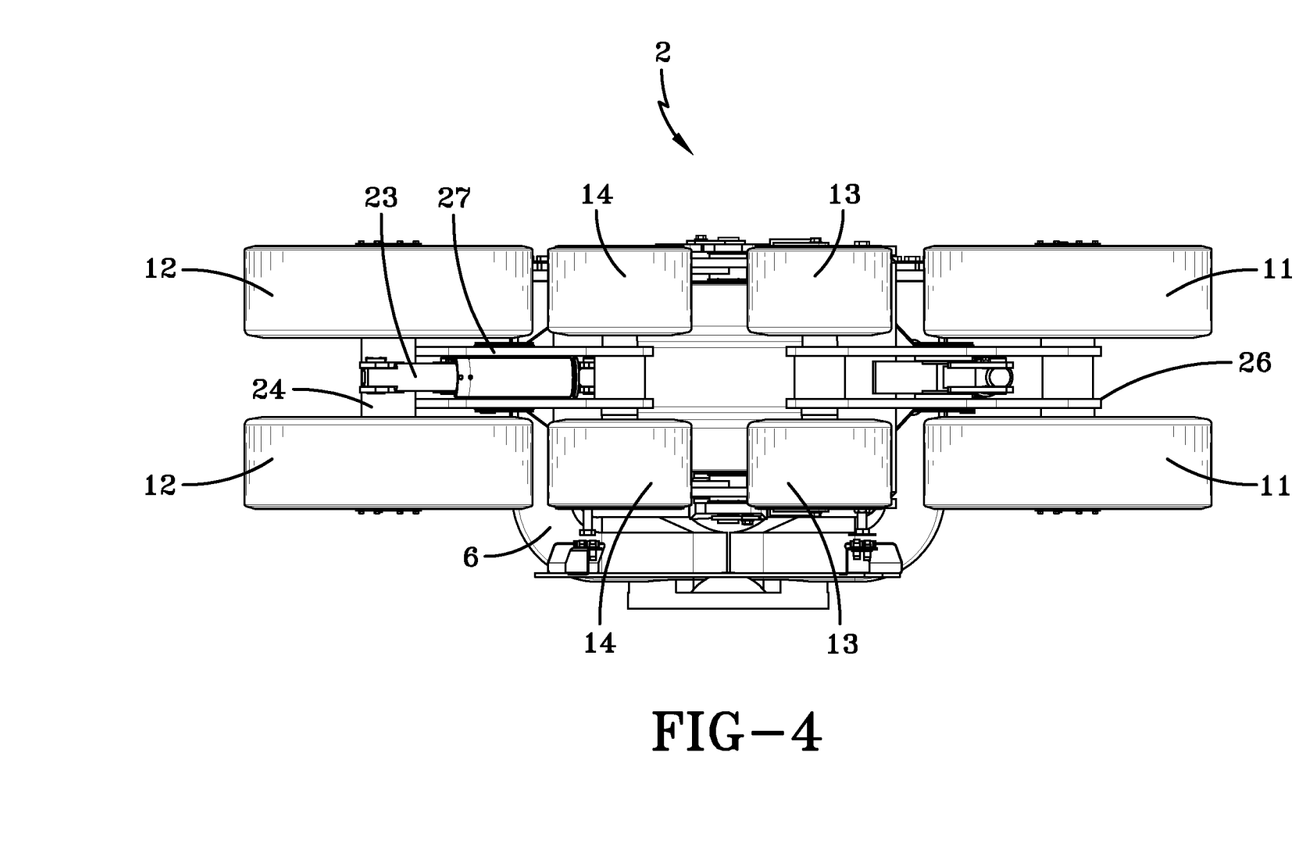
FIG. 4 is a bottom view of a track suspension with the front wheel articulated above the flat position.
Figure 5:
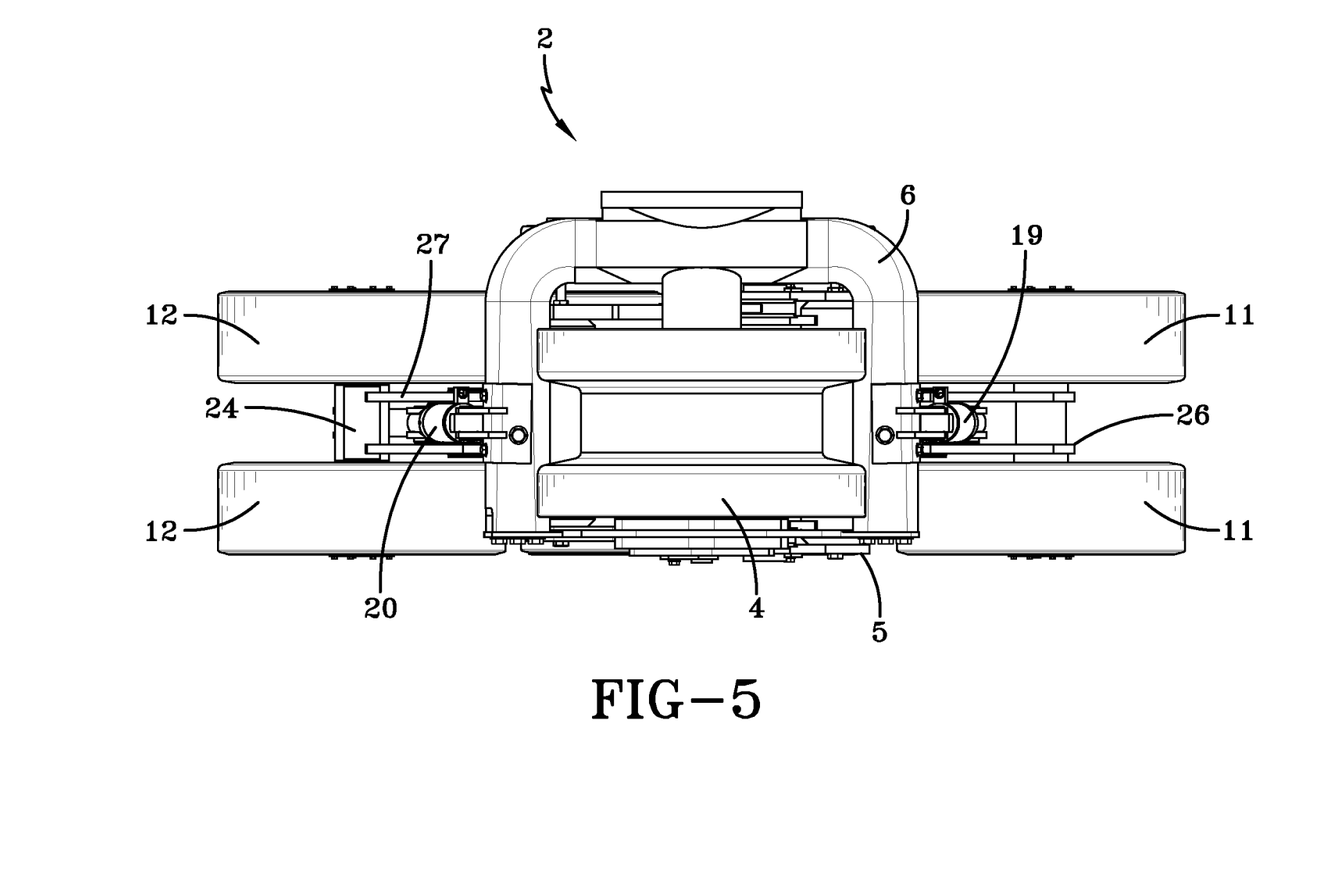
FIG. 5 is a top view of a track suspension with the front wheel articulated above the flat position.

FIG. 1 shows a side view of a track suspension system 1 of the present invention as adapted to be utilized on a vehicle. The track suspension system includes a track suspension 2 and a rubber track 3. The rubber track 3 is adapted to be ground contacting. The rubber track 3 is also adapted to engage with the track suspension 2, including a drive wheel 4. The drive wheel 4 is adapted to be driven by a final drive assembly of the vehicle. The drive wheel 4 is also adapted to engage and drive the rubber track 3. The drive wheel 4 will generally be rotatably affixed to and supported by the final drive assembly of the vehicle. The final drive assembly of the vehicle will generally include a yoke assembly 6.

The track suspension 2 also includes a yoke plate carrier 5 which is affixed to the yoke assembly 6. In one embodiment of the present invention, a rear wishbone member 7 may be rotatably affixed to the yoke assembly 6 and the yoke plate carrier 5 through a rear wishbone joint 8. A front wishbone member 10 is rotatably affixed to the rear wishbone member 7 through a front wishbone joint 9. This arrangement is useful in the event that a higher percent of the load carried by the track suspension 2 is desired to be carried through the rear wishbone member 7.

Alternatively, the front wishbone member 10 may be rotatably affixed to the yoke assembly 6 and the yoke plate carrier 5 through the front wishbone joint 9. In this arrangement the rear wishbone member 7 is rotatably affixed to the front wishbone member 10 through the rear wishbone joint 8. This arrangement is useful in the event that a higher percent of the load carried by the track suspension 2 is desired to be carried through the front wishbone member 7.

In another embodiment of the present invention, the rear wishbone member 7 may be rotatably affixed to the yoke assembly 6 and the yoke plate carrier 5 through the rear wishbone joint 8. The front wishbone member 10 may also be rotatably affixed to the yoke assembly 6 and the yoke plate carrier 5 through the front wishbone joint 9. This arrangement is useful in the event that it is desirable for the load carried by the track suspension 2 to be carried equally between the rear wishbone member 7 and the front wishbone member 10. In this embodiment it may also be desirable to position the front wishbone joint 9 and the rear wishbone joint 8 at the same location forming one single joint.

A front rocker assembly 16 is rotatably affixed to the front wishbone member 10 through a front rocker joint 18. The front rocker assembly 16 includes a front rocker beam 27, a front idler wheel 12, and a front roller wheel 14. The front idler wheel 12 and the front roller wheel 14 are rotatably affixed to the front rocker assembly 16 and are adapted to contact the rubber track 3. Alternatively, the front idler wheel 12 may be rotatably affixed to a tensioning member 24. The tensioning member 24 may be rotatably affixed to the front rocker beam 27 through a tensioning joint 25. The idler wheel is rotated about the tensioning joint by a tensioning cylinder 23. The tensioning cylinder 23 is affixed between the front rocker beam 27 and the tensioning member 24. The tensioning cylinder 23 extends in length, thereby rotating the tensioning member 24 about the tensioning joint 25. The rotation of the tensioning member 24 moves the front idler wheel 12 in the forward direction which places a greater tension on the rubber track 3. Either the front idler wheel 12, the front roller wheel 14, or both the front idler wheel 12 and the front roller wheel 14 may also be adapted to maintain the alignment of the rubber track 3.

A rear rocker assembly 15 is rotatably affixed to the rear wishbone member 7 through a rear rocker joint 18. The rear rocker assembly 15 includes a rear rocker beam 26, a rear idler wheel 11, and a rear roller wheel 13. The rear idler wheel 11 and the rear roller wheel 13 are rotatably affixed to the rear rocker beam 26 and are adapted to contact the rubber track 3. Alternatively, the rear idler wheel may be rotatably affixed to a tensioning member. The tensioning member may be rotatably affixed to the rear rocker beam 26 through a tensioning joint. The idler wheel is rotated about the tensioning joint by a tensioning cylinder. The tensioning cylinder is affixed between the rear rocker beam 26 and the tensioning member. The tensioning cylinder extends in length, thereby rotating the tensioning member about the tensioning joint. The rotation of the tensioning member moves the rear idler wheel 11 in the rearward direction which places a greater tension on the rubber track 3. Either the rear idler wheel 11, the rear roller wheel 13, or both the rear idler wheel 11 and the rear roller wheel 13 may also be adapted to maintain the alignment of the rubber track 3.

A front suspension spring assembly 20 is affixed between the yoke assembly 6 and the front wishbone member 10. The front suspension spring assembly 20 provides for the load carrying capacity of the track suspension 2 by maintaining the vertical distance between the yoke assembly 6 and the front wishbone member 10. The front suspension spring assembly 20 must have some compliance so that the front rocker assembly 16 can move relative to the yoke assembly 6 and yoke plate carrier 5. The relative displacement of the front rocker assembly 16 with respect to the yoke assembly 6 and yoke plate carrier 5 provides a reduced amplitude of displacement to the vehicle from the track suspension 2. The relative displacement of the front rocker assembly 16 with respect to the yoke assembly 6 and yoke plate carrier 5 also allows for an increased contact area between the rubber track 3 and the ground, thereby providing an increased tractive force. The front suspension spring assembly 20 may be a hydraulic suspension assembly, a pneumatic suspension assembly, a mechanical suspension assembly, or any suspension assembly known in the art.

A rear suspension spring assembly 19 is affixed between the yoke assembly 6 and the rear wishbone member 7. The rear suspension spring assembly 19 provides for the load carrying capacity of the track suspension 2 by maintaining the vertical distance between the yoke assembly 6 and the rear wishbone member 7. The rear suspension spring assembly 19 must have some compliance so that the rear rocker assembly 15 can move relative to the yoke assembly 6 and yoke plate carrier 5. The relative displacement of the rear rocker assembly 15 with respect to the yoke assembly 6 and yoke plate carrier 5 provides a reduced amplitude of displacement to the vehicle from the track suspension 2. The relative displacement of the rear rocker assembly 15 with respect to the yoke assembly 6 and yoke plate carrier 5 also allows for an increased contact area between the rubber track 3 and the ground, thereby providing an increased tractive force. The rear suspension spring assembly 19 may be a hydraulic suspension assembly, a pneumatic suspension assembly, a mechanical suspension assembly, or any suspension assembly known in the art.

In embodiments utilizing hydraulic suspension assemblies for the front suspension spring assembly 20 and the rear suspension spring assembly 19, the front suspension spring assembly 20 and rear suspension spring assembly 19 may be connected to a common oil supply from a hydraulic accumulator. In embodiments utilizing pneumatic suspension assemblies for the front suspension spring assembly 20 and the rear suspension spring assembly 19, the front suspension spring assembly 20 and rear suspension spring assembly 19 may be connected to a common pneumatic pressure supply from a pneumatic accumulator.

The axis of the front wishbone joint 9, the axis of the front rocker joint 18, and the front idler wheel axis 22 should be substantially aligned. The alignment of these axes 9, 18, 22 reduces the tendency of the tension of the rubber track 3 or power transmitted through the rubber track 3 of causing motion of the front rocker assembly 16 or the front wishbone member 10. In order to have the least impact on the position of the track suspension 2 components, the front axis line 28 formed approximately through the axis of the front wishbone joint 9, the axis of the front rocker joint 18, and the front idler wheel axis 22 should substantially bisect the angle α between the leading edge of the rubber track 29 and the front lower edge of the rubber track 30. An angle β is formed between the front axis line 28 and the leading edge of the rubber track 29. An angle γ is formed between the front axis line 28 and the front lower edge of the rubber track 30. The difference between angle β and angle γ should be less than 14°. The difference between angle β and angle γ will preferably be less than 11°. The difference between angle β and angle γ will even more preferably be less than 8°. The difference between angle β and angle γ will most preferably be less than 5°.

An angle ω is formed between the front wishbone joint 9, the axis of the front rocker joint 18, and the front idler wheel axis 22. Angle ω should be substantially linear. Angle ω will normally be within the range between 165° and 195°. Angle ω will preferably be within the range between 168° and 192°. Angle ω will more preferably be within the range between 171° and 189°. Angle ω will even more preferably be within the range between 174° and 186°. Angle ω will most preferably be within the range between 177° and 183°.

The axis of the rear wishbone joint 8, the axis of the rear rocker joint 17, and the rear idler wheel axis 21 should be substantially aligned. The alignment of these axes 8, 17, 21 reduces the tendency of the tension of the rubber track 3 or power transmitted through the rubber track 3 of causing motion of the rear rocker assembly 15 or the rear wishbone member 7. In order to have the least impact on the position of the track suspension 2 components, the rear axis line 31 formed approximately through the axis of the rear wishbone joint 8, the axis of the rear rocker joint 17, and the rear idler wheel axis 21 should substantially bisect the angle δ between the trailing edge of the rubber track 32 and the rear lower edge of the rubber track 33. An angle ε is formed between the rear axis line 30 and the trailing edge of the rubber track 32. An angle τ is formed between the rear axis line 30 and the rear lower edge of the rubber track 33. The difference between angle ε and angle τ should be less than 14°. The difference between angle ε and angle τ will preferably be less than 11°. The difference between angle ε and angle τ will even more preferably be less than 8°. The difference between angle ε and angle τ will most preferably be less than 5°.

An angle σ is formed between the rear wishbone joint 8, the axis of the rear rocker joint 17, and the rear idler wheel axis 21. Angle σ should be substantially linear. Angle σ will normally be within the range between 165° and 195°. Angle σ will preferably be within the range between 168° and 192°. Angle σ will more preferably be within the range between 171° and 189°. Angle σ will even more preferably be within the range between 174° and 186°. Angle σ will most preferably be within the range between 177° and 183°.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

A track suspension system comprising a rubber track which is adapted to be ground contacting will be attached to an agricultural vehicle. A drive wheel will be rotatably affixed to and driven by a vehicle final drive axle assembly. The drive wheel will be adapted for engaging and driving the rubber track. A yoke plate carrier will be affixed to a yoke assembly.

A rear wishbone member will be rotatably affixed to the yoke assembly and the yoke plate carrier through a rear wishbone joint. A front wishbone member will be rotatably affixed to the rear wishbone member through a front wishbone joint. A front rocker assembly, which is comprised of a front rocker beam, a front idler wheel and a front roller wheel will be rotatably affixed to the front wishbone through a front rocker joint. A rear rocker assembly which is comprised of a rear rocker beam, a rear roller wheel and a rear idler wheel will be rotatably affixed to the rear wishbone member through a rear rocker joint.

A front suspension spring assembly will be affixed between the yoke assembly and the front wishbone member. A rear suspension spring assembly will be affixed between the yoke assembly and the rear wishbone member. The front suspension spring assembly and the rear suspension spring assembly will be hydraulic suspension assemblies which are connected to a common oil supply from a hydraulic accumulator.

While certain representative embodiments and details have been shown for the purpose of illustrating the subject invention, it will be apparent to those skilled in this art that various changes and modifications can be made therein without departing from the scope of the subject invention.

What is claimed is:

1. A track suspension comprising a drive wheel, a yoke plate carrier, a front wishbone member, a rear wishbone member, a front rocker assembly, a rear rocker assembly, a front suspension spring assembly and a rear suspension spring assembly, wherein the drive wheel is rotatably affixed to and driven by a vehicle final drive axle assembly, wherein the yoke plate carrier is affixed to a yoke assembly, wherein the rear wishbone member is rotatably affixed to the yoke assembly and the yoke plate carrier through a rear wishbone joint, wherein the front wishbone member is rotatably affixed to the rear wishbone member through a front wishbone joint, wherein the front rocker assembly is comprised of a front rocker beam, a front idler wheel and a front roller wheel, wherein the rear rocker assembly is comprised of a rear rocker beam, a rear roller wheel and a rear idler wheel, wherein the front rocker beam is rotatably affixed to the front wishbone through a front rocker joint, wherein the rear rocker beam is rotatably affixed to the rear wishbone member through a rear rocker joint, wherein the front suspension spring assembly is affixed between the yoke assembly and the front wishbone member, and wherein the rear suspension spring assembly is affixed between the yoke assembly and the rear wishbone member.

2. The track suspension of claim 1, wherein the front suspension spring assembly is selected from the group consisting of hydraulic suspension assembly, pneumatic suspension assembly and mechanical suspension assembly and the rear suspension spring assembly is selected from the group consisting of hydraulic suspension assembly, pneumatic suspension assembly and mechanical suspension assembly.

3. The track suspension of claim 1, wherein the front rocker assembly further comprises a track tensioning rocker and a track tensioning cylinder.

4. The track suspension of claim 1, wherein a center axis of the front wishbone joint, a center axis of the front rocker joint and a center axis of the front idler wheel are substantially aligned.

5. The track suspension of claim 4, wherein the center axis of the front wishbone joint, the center axis of the front rocker joint and the center axis of the front idler wheel are substantially aligned in such a manner as to substantially bisect the angle between the leading edge of the rubber track and the lower edge of the rubber track.

6. The track suspension of claim 1, wherein a center axis of the rear wishbone joint, a center axis of the rear rocker joint and a center axis of the rear idler wheel are substantially aligned.

7. The track suspension of claim 6, wherein the center axis of the rear wishbone joint, the center axis of the rear rocker joint and the center axis of the rear idler wheel are substantially aligned in such a manner as to substantially bisect the angle between the trailing edge of the rubber track and the lower edge of the rubber track.

8. A track suspension system comprising the track suspension as specified in claim 1 and a rubber track, wherein the drive wheel is drivingly engaged with the rubber track.

9. A track suspension comprising a drive wheel, a yoke plate carrier, a front wishbone member, a rear wishbone member, a front rocker assembly, a rear rocker assembly, a front suspension spring assembly and a rear suspension spring assembly, wherein the drive wheel is rotatably affixed to and driven by a vehicle final drive axle assembly, wherein the yoke plate carrier is affixed to a yoke assembly, wherein the front wishbone member is rotatably affixed to the yoke assembly and the yoke plate carrier through a front wishbone joint, wherein the rear wishbone member is rotatably affixed to the front wishbone member through a rear wishbone joint, wherein the front rocker assembly is comprised of a front rocker beam, a front idler wheel and a front roller wheel, wherein the rear rocker assembly is comprised of a rear rocker beam, a rear roller wheel and a rear idler wheel, wherein the front rocker beam is rotatably affixed to the front wishbone through a front rocker joint, wherein the rear rocker beam is rotatably affixed to the rear wishbone member through a rear rocker joint, wherein the front suspension spring assembly is affixed between the yoke assembly and the front wishbone member, and wherein the rear suspension spring assembly is affixed between the yoke assembly and the rear wishbone member.

10. The track suspension of claim 9, wherein the front suspension spring assembly is selected from the group consisting of hydraulic suspension assembly, pneumatic suspension assembly and mechanical suspension assembly and the rear suspension spring assembly is selected from the group consisting of hydraulic suspension assembly, pneumatic suspension assembly and mechanical suspension assembly.

11. The track suspension of claim 9, wherein the front rocker assembly further comprises a track tensioning rocker and a track tensioning cylinder.

12. The track suspension of claim 11, wherein a center axis of the front wishbone joint, a center axis of the front rocker joint and a center axis of the front idler wheel are substantially aligned.

13. The track suspension of claim 12, wherein the center axis of the front wishbone joint, the center axis of the front rocker joint and the center axis of the front idler wheel are substantially aligned in such a manner as to substantially bisect the angle between the leading edge of the rubber track and the lower edge of the rubber track.

14. The track suspension of claim 11, wherein a center axis of the rear wishbone joint, a center axis of the rear rocker joint and a center axis of the rear idler wheel are substantially aligned.

15. The track suspension of claim 14, wherein the center axis of the rear wishbone joint, the center axis of the rear rocker joint and the center axis of the rear idler wheel are substantially aligned in such a manner as to substantially bisect the angle between the trailing edge of the rubber track and the lower edge of the rubber track.

16. A track suspension comprising a drive wheel, a yoke plate carrier, a front wishbone member, a rear wishbone member, a front rocker assembly, a rear rocker assembly, a front suspension spring assembly and a rear suspension spring assembly, wherein the drive wheel is rotatably affixed to and driven by a vehicle final drive axle assembly, wherein the yoke plate carrier is affixed to a yoke assembly, wherein the front or rear wishbone member is rotatably affixed to the yoke assembly and the yoke plate carrier through a first wishbone joint, wherein the front or rear wishbone member is rotatably affixed to the front or rear wishbone member through a second wishbone joint or the front or rear wishbone member is rotatably affixed to the yoke assembly and the yoke plate carrier through the first or a second wishbone joint, wherein the front rocker assembly is comprised of a front rocker beam, a front idler wheel and a front roller wheel, wherein the rear rocker assembly is comprised of a rear rocker beam, a rear roller wheel and a rear idler wheel, wherein the front rocker beam is rotatably affixed to the front wishbone through a front rocker joint, wherein the rear rocker beam is rotatably affixed to the rear wishbone member through a rear rocker joint, wherein the front suspension spring assembly is affixed between the yoke assembly and the front wishbone member, and wherein the rear suspension spring assembly is affixed between the yoke assembly and the rear wishbone member.

* * * * *